United States Patent Office 3,369,924
Patented Feb. 20, 1968

3,369,924
GAS PRESSURE IMPREGNATION OF POROUS BEARING WITH MOLTEN TETRAFLUOROETHYLENE POLYMER
Ray Brown Duggins, Chadds Ford, Pa., and Harold Leonard Jackson, Hockessin, Del., assignors to E. I. du Pont de Nemours and Company, Wilmington, Del., a corporation of Delaware
No Drawing. Filed May 27, 1964, Ser. No. 370,701
5 Claims. (Cl. 117—65.2)

ABSTRACT OF THE DISCLOSURE

Process for producing bearings containing tetrafluoroethylene which comprises intimately contacting a rigid porous material such as steel, iron or brass with molten tetrafluoroethylene, followed by increasing the gas pressure by at least 200 mm. Hg, and cooling the resulting material.

---

The present invention is directed to a process for impregnating certain rigid porous materials with certain tetrafluoroethylene polymers or telomers and an article of manufacture comprising a rigid porous material containing tetrafluoroethylene polymers or telomers within the porous structure thereof.

It is known that certain porous materials composed of metal or graphite which are useful for preparing bearings and seals can be impregnated with high molecular weight polytetrafluoroethylene such as "Teflon," E. I. du Pont de Nemours and Company's tetrafluoroethylene resin. The purpose of impregnating these materials is to decrease the coefficient of friction between the metal and other surfaces with which the bearing comes in contact during use. However, it is difficult to impregnate the porous materials with high molecular weight polytetrafluoroethylene and obtain uniform and efficient filling of the porous material. It has also been found difficult to force the high molecular weight polytetrafluoroethylene sufficiently far into the porous materials to insure its being retained in the porous material. A further disadvantage is that porous bearing materials impregnated with high molecular weight polytetrafluoroethylene are not gas tight.

To overcome these difficulties, the art has attempted to mix low molecular weight polytetrafluoroethylene with powdered nickel and then fuse the mass to a solid bearing material. However, most metals have fusion temperatures above 400° C. and low molecular weight polytetrafluoroethylene decomposes above 350° C. to 400° C. Pressing the low molecular weight polytetrafluoroethylene-nickel mixture at temperatures below 400° C. results in fusion of the low molecular weight polytetrafluoroethylene rather than the metal.

An object of this invention is to provide a simple process for impregnating solid porous bearing materials with tetrafluoroethylene polymers which provides uniform distribution of the polymer and which produces a gas tight, chemically resistant bearing material. Another object is to provide a process which does not require fusion of the bearing material. A further object is to prepare porous bearing materials containing polytetrafluoroethylene polymers within the pores thereof. These and other objects will become apparent from the following discussion and examples.

More particularly, the present invention is directed to a process which comprises intimately contacting a rigid porous material and a molten tetrafluoroethylene polymer; increasing by at least about 200 mm. Hg; the gas pressure upon said porous material and contacting molten polymer and cooling said porous material impregnated with said tetrafluoroethylene polymer, said porous material being selected from the group consisting of porous metals and graphitic materials and said tetrafluoroethylene polymer having a molecular weight of from about 500 to about 30,000, a crystalline melting point of from about 90° C. to about 327° C. and consisting of a chain of units having the structure $-CF_2CF_2-$ and containing at least about 90% by weight of said units.

The present invention is also directed to graphitic and metallic bearing materials prepared according to the above process containing uniformly dispersed polytetrafluoroethylene polymer having the above physical and chemical properties.

The present invention is a process for preparing solid materials which are useful for fabricating bearings, brushes, sleeves, lines, thrust washers, journals and other rotatable members for coacting with plain bearing elements, sliding elements, elements for ball or roller bearings and, in general, elements which have working surfaces which slide or roll against other surfaces.

The present invention comprises contacting a porous bearing material with a molten tetrafluoroethylene polymer, then increasing the gas pressure thereon by at least 200 mm. Hg. As used herein, the term gas pressure means the pressure of the gas forming the atmosphere which surrounds the bearing material and contacting molten tetrafluoroethylene polymer. This gas may be air itself or any other gaseous material which is essentially inert to both the bearing-forming material and the tetrafluoroethylene polymer. The important feature of the process is that this gas pressure be increased by at least about 200 mm. Hg, not the initial pressure or the final pressure used. In general, two modes of operation can be used. In one mode, the bearing material and tetrafluoroethylene polymer are placed in a vessel which is evacuated to a pressure at least 200 mm. Hg below ambient atmospheric pressure. The mixture is then heated until the tetrafluoroethylene polymer melts. The bearing material is thoroughly contacted with the melt and then the vacuum is released allowing the gas pressure on the bearing material to return to ambient atmospheric pressure. The bearing material and tetrafluoroethylene polymer are then cooled to ambient temperature and separated. In a second mode of operation, the bearing material and tetrafluoroethylene polymer under either a vacuum or ambient atmospheric pressure are heated together in a pressure vessel until the tetrafluoroethylene polymer melts and the bearing material is thoroughly covered. Then the pressure in the vessel is raised above ambient atmospheric pressure so that the total pressure change is greater than 200 mm. Hg, say by opening a valve connecting the pressure vessel to a source of air or other inert gas under higher pressure. The bearing material and tetrafluoroethylene polymer are then cooled to ambient temperature while the higher pressure is maintained. When the materials are cool, the pressure may be released.

Since the present process requires that the tetrafluoroethylene polymer be molten, the minimum useful temperature to which the bearing material and tetrafluoroethylene polymer must be heated is the melting point of the polymer. The melting point of the polymer varies from 90° C. to 327° C. The maximum useful temperature which may be used is the decomposition temperature of the tetrafluoroethylene polymer which generally lies somewhere between about 300° C. and about 500° C. In general, a practical maximum is about 375° C. A minimum increase in gas pressure of about 200 mm. Hg is required. There is no maximum limit on the gas pressure increase which may be used; any gas pressure increase that is attainable with the process equipment may be used. When the gas pressure increase is obtained by first drawing a vacuum then releasing the vacuum to the ambient atmosphere, then the maximum pressure increase is necessarily no greater than 700 to 760 mm. Hg. A larger increase may be attained if pressure is applied by releasing the vacuum with pressurized gas. When the gas pressure increase is attained by applying pressurized gas, a practical maximum can be as high as 600 atmospheres, the extreme pressure limit of most readily available equipment. From 60 to 70 atmospheres is a practical and useful upper limit for most purposes. The extent of pressure increase which is preferred varies with the nature of the porous bearing material and the viscosity of the tetrafluoroethylene polymer melt. In general, small pores in the bearing material or more viscous polymer melts require higher pressure increases.

Covering the surface of the porous bearing material with the molten tetrafluoroethylene polymer is accomplished usually by surrounding the bearing material with sufficient polymer to cover the bearing material. Unused polymer is recovered for reuse.

The porous bearing materials include porous metals and porous graphitic materials. The metals may include steel, cast iron, brass, bronze and other metals normally used for preparing bearings. The porous structure is produced by well-known methods such as sintering, etching, and the like. Porous graphitic materials are well known. These bearing materials are described in the following U.S. Patents: 2,691,814; 2,731,360; 2,788,324; 2,798,005; 2,813,041; 2,964,476; 2,972,549 and 2,995,462, for example. The tetrafluoroethylene polymers used to impregnate the porous bearing material consist of chains composed of —$CF_2CF_2$— units and are composed of at least 90% by weight of such units. These polymers have molecular weights of from 500 to 30,000 and have melting points of from 90° C. to 327° C. There are several sources of such tetrafluoroethylene polymers. One particularly desirable source is the so-called tetrafluoroethylene telomers. The telomers described in U.S. Patent 3,067,262 are particularly useful. Other telomers are disclosed in the following U.S. Patents: 2,411,158; 2,433,844; 2,443,003; 2,540,088; 2,562,547 and 3,019,261. It is understood, of course, that only those telomers having molecular weights between 500 and 30,000 and melting points between 90° C. and 327° C. are useful in this invention even though the aforementioned patents disclose telomers which do not meet these requirements. Another source of useful tetrafluoroethylene polymers is the degradation of high molecular weight polytetrafluoroethylene by the process described in U.S. Patent 2,496,978. All of these materials are composed of at least 90% by weight —$CF_2CF_2$— units.

The bearing materials prepared by this invention find uses such as those set out earlier. These bearing materials are particularly useful in situations where other forms of lubricated bearings cannot readily be used such as in chemical pumps, compressors, autoclaves and food processing machinery where oils, etc. cannot be used. It is often desirable that bearings act as gas seals as well as bearings such as in vacuum pumps, compressors and the like. For this reason the gas tight bearings produced by the present process are an improvement over those of the art.

The following examples are given by way of illustration and in no way limit the scope of the present invention.

METHOD I

A tetrafluoroethylene telomer prepared according to Example 1 to U.S. Patent 3,067,262, having a molecular weight of 3500 and M.P. of 298° C., was placed in a flask along with the porous bearing material. A high vacuum was applied to the flask, then the contents were heated to 325° C. The system was then vented to the atmosphere, forcing the telomer into the rigid porous solid. The contents of the flask were cooled to ambient temperature.

METHOD II

A telomer of tetrafluoroethylene and trichlorotrifluoroethane was prepared according to the general method of Example 5 of U.S. Patent 3,067,262, omitting the active telogen. The feed rates and reaction conditions were as follows: 0.081 mole tetrafluoroethylene per mole of trichlorotrifluoroethane, 58 moles tetrafluoroethylene per mole of di-tertbutyl peroxide, temperature 150° C., pressure 600 p.s.i.g. (42.2 kg./cm.$^2$). The telomer product had a melting point of 323° C. to 327° C. and a molecular weight of about 30,000. It had specific infrared ratios of 0.2 to 0.3 at 3.4 microns and 0.2 to 0.23 at 10.4 microns. The meanings of these ratios are explained in U.S. Patent 3,067,262.

In separate pressure vessels were placed samples of the above-prepared telomer, commercial high molecular weight polytetrafluoroethylene known as "Teflon 30" produced by E. I. du Pont de Nemours and Company and commercial tetrafluoroethylene-hexafluoropropylene copolymer known as "Teflon FEP" resin produced by E. I. du Pont de Nemours and Company. Porous bearing solids were added to each vessel and the vessels were sealed. A vacuum was applied to each vessel and each vessel was then heated at 375° C. until the various polymeric materials therein had melted. Each vessel was then pressurized with $N_2$ to 1000 p.s.i.g. (70.3 kg./cm.$^2$), and held for one hour. The vessels were then cooled to ambient temperature and vented.

It is understood, of course, that the above telomers are merely illustrative; any of the other tetrafluoroethylene polymers disclosed above can be used.

Example I

Thrust washers were made of porous carbon-graphite (Pure Carbon grade P2W) impregnated according to Method I with the low molecular weight telomer and according to Method II with the high molecular weight telomer, high molecular weight polytetrafluoroethylene and hexafluoropropylene-tetrafluoroethylene copolymer. Wear tests were performed on each impregnated washer by rotating a cold rolled steel washer (finished to 16 microinch (40.7 millimicrons) hardness $R_c$ 20) on each carbon washer under 100 p.s.i. (7 kg./cm.$^2$) load and at 100 f.p.m. (50.8 cm./sec.) surface velocity. The results are shown below

| Impregnate | Wear-In, mg. loss (20 hrs.) | Wear, mg. loss (100 hrs.) |
|---|---|---|
| Low M.W. telomer Method I | 11.5 | 23 |
| High M.W. telomer Method II | 9.0 | 24 |
| Hexafluoropropylenetetrafluoroethylene Copolymer Method II | 17.5 | 34.5 |
| High M.W. polytetrafluoroethylene Method II | 20.0 | 37 |

Example II

Bronze thrust washers (type MD-101 bronze) were impregnated, one with the low molecular weight telomer according to Method I and one each with the hexafluoropropylene-tetrafluoroethylene copolymer and high molecular weight polytetrafluoroethylene according to Method II. These three bronze thrust washers and an untreated washer were wear tested using the same test as in Example I. The results are shown below.

| Impregnate | Wear-In, mg. loss (20 hrs.) | Wear, mg. loss (100 hrs.) |
|---|---|---|
| Low M.W. telomer Example I | 100 | 510 |
| Hexafluoropropylenetetrafluoroethylene Copolymer Method II | ~1,100 | Failed |
| High M.W. polytetrafluoroethylene Method II | ~1,100 | Failed |
| None | ~1,100 | Failed |

Example III

Samples of three of the carbon-graphite bearing materials of Example I and a commercial, high molecular weight polytetrafluoroethylene-containing bearing ("Purebon" P2W, Pure Carbon Co.) were tested for rate of diffusion of gas through the bearing materials. Each sample of bearing material was sealed in a cell and the rate of diffusion of argon under pressure was measured under various pressures. The rates of diffusion are shown below.

RATE, CC./MIN., STP

| Pressure | | Low M.W. Telomer Method II | High M.W. Polytetrafluoroethylene Method II | TFE-HFP* Copolymer Method II | Commercial Bearing High M.W. Polytetrafluoroethylene (Pure Carbon Co.) |
|---|---|---|---|---|---|
| P.s.i. | (Kg./cm.²) | | | | |
| 10 | (0.70) | 0.25 | ~2,100 | ~2,100 | 6.2 |
| 20 | (1.41) | 0.55 | ~4,600 | ~4,600 | 12.0 |
| 30 | (2.11) | 1.0 | ~6,000 | ~6,000 | 21.4 |
| 40 | (2.81) | 1.4 | | | 34.9 |

*TFE-HFP = Tetrafluoroethylene-hexafluoropropylene.

It is apparent that the telomer-impregnated bearing is superior to the bearings impregnated with high molecular weight polymers of tetrafluoroethylene.

Example IV

Six porous carbon-graphite (Pure Carbon grade P2W) sleeve bearings, 1 inch (2.54 cm.) long, 1¼ inches (3.18 cm.) O.D., 1 inch (2.54 cm.) I.D., were impregnated by Method II with the low molecular weight telomer, and six identical bearings were impregnated in the same manner with the high molecular weight telomer. Wear tests were performed with each of these bearings and with similar series of untreated P2W carbon-graphite bearings and commercially ("Purebon" P2W-TF, Pure Carbon Co.) high molecular weight polytetrafluoroethylene containing carbon-graphite bearings. The tests consisted of running the sleeve bearings under a 50 p.s.i. (3.5 kg./cm.²) radial load on a cold steel shaft (finished to 16 microinch (40.7 millimicrons) hardness $R_c$ 20) rotating at a velocity of 100 feet per minute (50.8 cm./sec.). Clearance between each bearing inner wall and the shaft was 0.005 in. (127 microns). The wear of each type of bearing as shown by the total average weight loss is recorded below.

| Impregnate | Bearing Wear (Total Weight Loss in mg.) | | |
|---|---|---|---|
| | 24 hrs. | 40 hrs. | 86 hrs. |
| Low M.W. telomer | 19.9 | 32.0 | 62.5 |
| High M.W. telomer | 28.5 | 47.6 | 96.0 |
| High M.W. polytetrafluoroethylene | Test stopped because of excess torque and temperature | | |
| None | 154.7 | 166.1 | 189.4 |

The superiority of the telomer-impregnated sleeve bearings is apparent from the above data since the high molecular weight polytetrafluoroethylene impregnated bearings failed to operate satisfactorily under the test conditioner and the unimpregnated bearings showed weight losses greatly in excess of those of the telomer-impregnated bearings.

As many apparently widely different embodiments of this invention may be made without departing from the spirit and scope thereof, it is to be understood that this invention is not limited to the specific embodiments described herein.

We claim:

1. A process for producing bearing materials containing tetrafluoroethylene polymer which comprises intimately contacting a rigid porous material and a molten tetrafluoroethylene polymer; increasing the gas pressure upon said porous material and contacting molten polymer by at least about 200 mm. Hg; and cooling said porous material impregnated with said tetrafluoroethylene polymer, said porous material being selected from the group consisting of porous metals and graphitic materials and said tetrafluoroethylene polymer having a molecular weight of from about 500 to about 30,000, a crystalline melting point of from about 90° C. to about 327° C. and consisting of a chain of units having the structure —$CF_2CF_2$— and containing at least about 90% by weight of said units.

2. A graphitic bearing material containing tetrafluoroethylene polymer produced in accordance with the process of claim 1.

3. A bronze bearing material containing tetrafluoroethylene polymer produced in accordance with the process of claim 1.

4. The process of claim 1 wherein the temperature at which the process is carried out is between 300° C. and 500° C. and wherein the maximum pressure attained in the process is at most 70 atmospheres.

5. The process of claim 1 wherein the tetrafluoroethylene polymer defined therein is a telomer of tetrafluoroethylene and trichlorotrifluoroethane.

References Cited

UNITED STATES PATENTS

| 2,364,713 | 12/1944 | Hensel | 117—119 X |
| 2,691,814 | 10/1954 | Tait | 117—132 X |
| 2,718,485 | 9/1955 | Samuely | 117—49 X |
| 2,838,829 | 6/1958 | Goss et al. | 117—119 X |
| 2,982,671 | 5/1961 | Hunter | 117—119 X |
| 3,049,448 | 8/1962 | Millet | 117—119 X |
| 3,160,519 | 12/1964 | Parisot et al. | 117—119 X |
| 3,298,753 | 1/1967 | Eaton | 308—238 X |

RALPH S. KENDALL, *Primary Examiner.*